(12) United States Patent
Syed et al.

(10) Patent No.: US 12,473,843 B2
(45) Date of Patent: Nov. 18, 2025

(54) HYBRID ELECTRIC PROPULSION SYSTEM WITH PITCH CHANGE MECHANISM OPERATION

(71) Applicant: Pratt & Whitney Canada Corp., Longueuil (CA)

(72) Inventors: Yusuf Syed, Oakville (CA); Thomas Trevor Ricci, Kirkland (CA); James Jarvo, Long Sault (CA)

(73) Assignee: Pratt & Whitney Canada Corp., Longueuil (CA)

( * ) Notice: Subject to any disclaimer, the term of this patent is extended or adjusted under 35 U.S.C. 154(b) by 6 days.

(21) Appl. No.: 18/436,753

(22) Filed: Feb. 8, 2024

(65) Prior Publication Data
US 2024/0271547 A1 Aug. 15, 2024

Related U.S. Application Data

(60) Provisional application No. 63/445,169, filed on Feb. 13, 2023.

(51) Int. Cl.
*F01D 25/20* (2006.01)
*F01D 15/08* (2006.01)
(Continued)

(52) U.S. Cl.
CPC ............ *F01D 25/20* (2013.01); *F01D 15/08* (2013.01); *F01D 15/12* (2013.01); *F01M 1/12* (2013.01);
(Continued)

(58) Field of Classification Search
CPC .... F01D 25/20; F01D 15/08; F05D 2220/323; B64D 31/18; B64C 11/38
See application file for complete search history.

(56) References Cited

U.S. PATENT DOCUMENTS 4,533,296 A * 8/1985 Duchesneau ........... B64C 11/40
416/46
6,655,631 B2 * 12/2003 Austen-Brown .... B64D 27/355
244/12.4
(Continued)

FOREIGN PATENT DOCUMENTS

GB 1420625 A 1/1976
WO 2023012435 A1 2/2023

OTHER PUBLICATIONS

EP search report for EP24156938.3 dated Jun. 5, 2024.

*Primary Examiner* — Michael A Riegelman
(74) *Attorney, Agent, or Firm* — Getz Balich LLC

(57) ABSTRACT

A hybrid electric propulsion system for an aircraft is provided that includes a thermal engine, an electric motor, a gearbox, an electric power storage unit, a propulsion unit, and a controller. The thermal engine has a main oil pump configured to be driven by the thermal engine. The gearbox is in communication with the thermal and electric motors. The propulsion unit includes a propeller having propeller blades, and a pitch change mechanism. The controller is in communication with the thermal and electric motors, the propulsion unit, and a memory storing instructions. The instructions when executed cause the controller to control the electric motor to operate using electrical power from the electric power storage unit to cause the main oil pump to actuate and produce a flow of engine oil to the pitch change mechanism for a period of time sufficient to feather the propeller blades.

14 Claims, 7 Drawing Sheets

(51) Int. Cl.
  *F01D 15/12* (2006.01)
  *F01M 1/12* (2006.01)
  *F01M 1/16* (2006.01)
  *B64C 11/32* (2006.01)
  *F01D 15/10* (2006.01)

(52) U.S. Cl.
  CPC ............ *F01M 1/16* (2013.01); *B64C 11/325* (2013.01); *F01D 15/10* (2013.01); *F05D 2220/323* (2013.01)

(56) References Cited

U.S. PATENT DOCUMENTS

| | | | | |
|---|---|---|---|---|
| 7,118,336 B2* | 10/2006 | Waddleton | ................ | F02C 7/32 |
| | | | | 184/6.12 |
| 8,939,399 B2* | 1/2015 | Kouros | ................ | B64D 27/33 |
| | | | | 244/17.11 |
| 9,008,942 B2* | 4/2015 | Dyrla | ................ | B64D 35/02 |
| | | | | 701/99 |
| 9,045,223 B2* | 6/2015 | Connaulte | ............. | B64D 27/33 |
| 11,014,655 B2* | 5/2021 | Smith | ................ | B64D 27/33 |
| 11,077,937 B1* | 8/2021 | Bruell | ................ | B64C 11/001 |
| 11,097,850 B2* | 8/2021 | Niergarth | ............. | B64D 35/024 |
| 11,560,237 B2* | 1/2023 | Zoppitelli | ............. | B64D 35/04 |
| 11,629,651 B2* | 4/2023 | Bowden | ............. | B64D 35/025 |
| | | | | 60/204 |
| 11,649,038 B2* | 5/2023 | Mark | ................. | B60L 3/04 |
| | | | | 180/65.285 |
| 11,745,888 B2* | 9/2023 | Harvey | ................ | F02K 5/00 |
| | | | | 244/53 R |
| 11,794,913 B2* | 10/2023 | Lacaux | ................. | B64D 27/34 |
| 11,807,371 B2* | 11/2023 | Becker | .................. | B64D 31/18 |
| 11,814,154 B2* | 11/2023 | Freely | ................. | B64D 27/33 |
| 12,196,090 B1* | 1/2025 | Larose | ................ | B64D 35/022 |
| 12,241,425 B2* | 3/2025 | Syed | ................. | B64D 31/06 |
| 2015/0139798 A1* | 5/2015 | Duke | ................ | G01P 3/487 |
| | | | | 416/61 |
| 2018/0017209 A1* | 1/2018 | Pedrami | ................ | B64C 11/00 |
| 2018/0050810 A1* | 2/2018 | Niergarth | ................ | F02C 6/206 |
| 2018/0050811 A1* | 2/2018 | Niergarth | ............... | B64D 27/32 |
| 2021/0031934 A1* | 2/2021 | Becker | ................. | B64C 1/16 |
| 2021/0229826 A1* | 7/2021 | Mercier | ................. | B64D 27/33 |
| 2021/0354837 A1* | 11/2021 | Mark | ................. | H02H 7/0833 |
| 2022/0144439 A1* | 5/2022 | Roberts | ................. | B64C 11/00 |
| 2023/0250766 A1* | 8/2023 | Des Roches-Dionne | ................ | |
| | | | | B64C 11/34 |
| | | | | 416/27 |
| 2023/0417180 A1* | 12/2023 | Klonowski | ............. | F02C 6/206 |
| 2024/0150010 A1* | 5/2024 | Krzywon | ................ | B64C 11/38 |
| 2024/0271547 A1* | 8/2024 | Syed | ................. | B64D 35/025 |
| 2024/0271577 A1* | 8/2024 | Syed | ................. | F01D 15/10 |
| 2024/0417078 A1* | 12/2024 | Durocher | ............... | B64D 27/30 |
| 2025/0116208 A1* | 4/2025 | Piazza | ................ | F02C 7/32 |
| 2025/0146442 A1* | 5/2025 | Martina | ................. | F02C 7/22 |

\* cited by examiner

HYBRID ELECTRIC PROPULSION SYSTEM WITH PITCH CHANGE MECHANISM OPERATION

This application claims priority to U.S. Patent Appln. No. 63/445,169 filed Feb. 13, 2023, which is hereby incorporated herein by reference in its entirety.

BACKGROUND OF THE INVENTION

1. Technical Field

The present disclosure relates to hybrid-electric aircraft propulsion systems and methods for operating the same.

2. Background Information

A propeller driven aircraft includes a powerplant that drives the propeller to produce thrust. The propeller pitch is the angle that the blade presents to the plane of rotation of the propeller. The blade pitch angle known as "feather" describes the pitch wherein the propeller blades are substantially leading edge-on to the forward direction of travel and represent a minimum drag to the aircraft. "Flat pitch" refers to the pitch angle that is about zero degrees; i.e., the blades present an essentially flat face to the direction of travel; e.g., see FIG. 1.

In the case of an aircraft having a powertrain comprising a thermal engine (e.g., a gas turbine engine, or an internal combustion engine), it is possible that the thermal engine may experience a failure that requires, or results in, a shutdown of the thermal engine. If this occurs, the increased inertia of the thermal engine compared to a traditional windmilling gas turbine engine can lead to difficulties feathering the propeller which is essential to avoid substantial drag on the aircraft. The propeller pitch may also produce adverse air flow effects for aircraft control surfaces (e.g., elevators) if not properly oriented when the engine is shutdown.

What is needed is a system and method for a propeller driven aircraft that can address the issue of a propeller feathering.

SUMMARY

According to an aspect of the present disclosure, a hybrid electric propulsion (HEP) system for an aircraft is provided that includes a thermal engine, an electric motor, a gearbox, an electric power storage unit, a propulsion unit, and a controller. The thermal engine has an engine oil system with a main oil pump configured to be driven by the thermal engine. The gearbox is in communication with the thermal engine and the electric motor. The propulsion unit includes a propeller having propeller blades, and a hydro-mechanical pitch change mechanism. The controller is in communication with the thermal engine, the electric motor, the propulsion unit, and a memory storing instructions. The instructions when executed cause the controller to control the electric motor to operate using electrical power from the electric power storage unit to cause the main oil pump to actuate and produce a pressurized flow of engine oil to the pitch change mechanism for a period of time sufficient for the pitch change mechanism to feather the propeller blades.

In any of the aspects or embodiments described above and herein, the thermal engine and the electric motor may be in communication with the gearbox in a parallel configuration.

In any of the aspects or embodiments described above and herein, the gearbox may be in communication with thermal engine and the propulsion unit.

In any of the aspects or embodiments described above and herein, the instructions when executed may cause the controller to control the electric motor to operate using electrical power from the electric power storage unit to cause the main oil pump to actuate and produce the pressurized flow of engine oil to the pitch change mechanism for the period of time sufficient for the pitch change mechanism to feather the propeller blades when the thermal engine is in a shutdown mode.

In any of the aspects or embodiments described above and herein, the instructions when executed may cause the controller to control the electric motor to selectively operate in a generator mode when the HEP system is operating in a normal mode.

In any of the aspects or embodiments described above and herein, the HEP system may include an electric motor control system integral with the controller, wherein the electric motor control system includes an inverter.

In any of the aspects or embodiments described above and herein, the HEP system may include an electric motor control system independent of and in communication with the controller, wherein the electric motor control system includes an inverter.

In any of the aspects or embodiments described above and herein, the HEP system may include a second gearbox in communication with the thermal engine and the electric motor, wherein the electric motor, the gearbox, the thermal engine, the second gearbox and the propulsion unit are disposed in a series arrangement.

According to another aspect of the present disclosure, a method of operating a hybrid electric propulsion (HEP) system for an aircraft is provided, wherein the HEP system includes a thermal engine, an electric motor, a gearbox in communication with the thermal engine and the electric motor, an electric power storage unit, a propulsion unit including a propeller having propeller blades, and an hydro-mechanical pitch change mechanism, and wherein the thermal engine has an engine oil system with a main oil pump that is configured to be driven by the thermal engine. The method includes: selectively operating the electric motor to provide propulsive power to the propulsion unit in combination with the thermal engine when the HEP system is operating in a normal mode; and operating the electric motor to provide to cause the main oil pump to actuate and produce a pressurized flow of engine oil to the pitch change mechanism for a period of time sufficient for the pitch change mechanism to feather the propeller blades when the thermal engine is in a shutdown mode.

In any of the aspects or embodiments described above and herein, the method may include powering the electric motor using electrical power from the electric power storage unit when the thermal engine is in the shutdown mode.

In any of the aspects or embodiments described above and herein, the method may include controlling the electric motor to selectively operate in a generator mode when the HEP system is operating in the normal mode.

In any of the aspects or embodiments described above and herein, wherein the instructions when executed cause the controller to control, or the method includes controlling, the electric motor to control a rate of unfeathering of the propeller.

In any of the aspects or embodiments described above and herein, wherein the instructions when executed cause the controller to control, or the method includes controlling, the electric motor as a function of a torque and/or a rate of change of torque applied by the electric motor to the propeller.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 2:
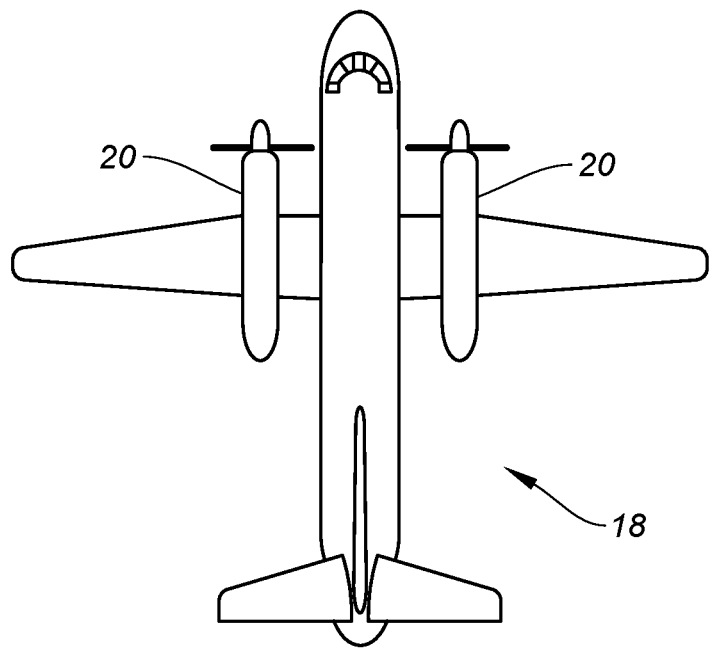
FIG. 2 is a diagrammatic representation of an aircraft that includes present disclosure HEP systems.

Referring to FIG. 2, the present disclosure system is directed to an aircraft 18 that includes one or more hybrid electric propulsion (HEP) system 20. FIG. 2 illustrates a manned fixed wing aircraft having a pair of HEP systems 20. The present disclosure is not limited to this aircraft example, and is applicable to other aircraft including unmanned fixed wing aircraft, manned rotary aircraft, unmanned rotary aircraft, and the like.

Figure 3:
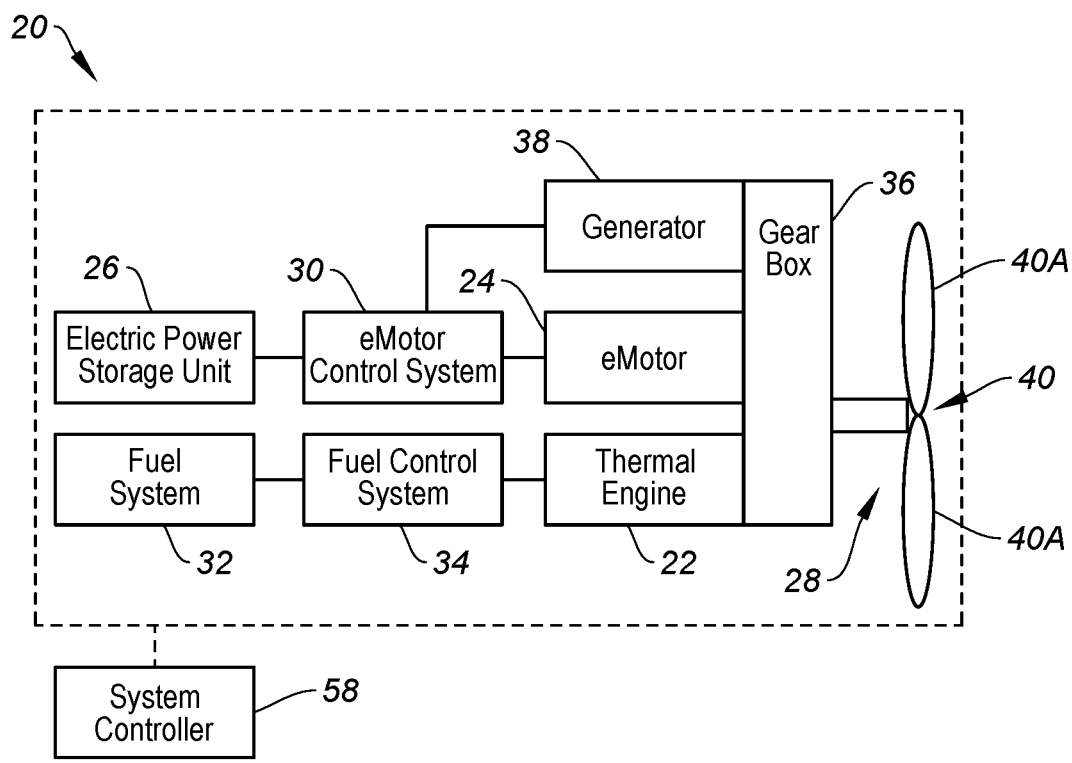
FIG. 3 is a diagrammatic representation of a present disclosure HEP system in a parallel configuration.
Figure 4:
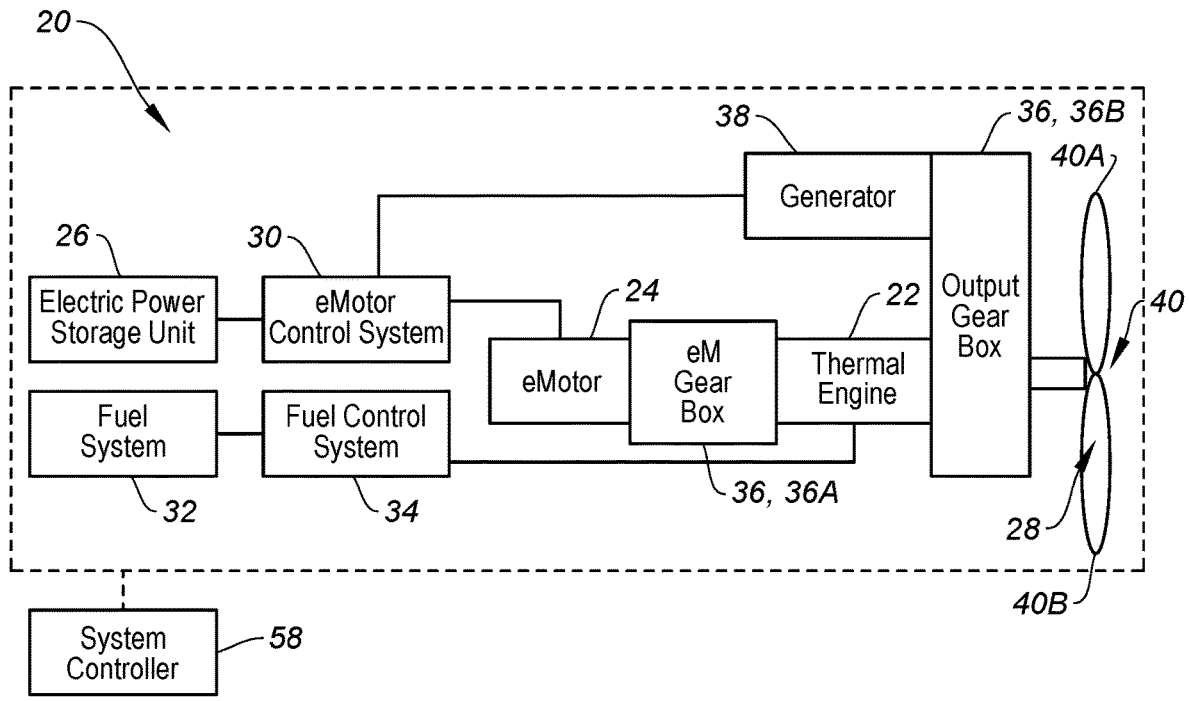
FIG. 4 is a diagrammatic representation of a present disclosure HEP system in a series configuration.

Referring to FIGS. 3 and 4, the present disclosure HEP system 20 includes a thermal engine 22, an electric motor 24 ("eMotor 24"), an electric power storage unit 26, and a propulsion unit 28. Embodiments of the HEP system 20 may include an electric motor control system ("eMotor control system 30"), a fuel system 32, a fuel control system 34, and one or more gearboxes 36, as well as other components. As described herein, present disclosure system embodiments may include an electric generator 38.

To facilitate the description herein, the present disclosure HEP system 20 is described as a singular system that can be used to power an aircraft. In some embodiments, more than one present disclosure HEP system 20 may be used to power an aircraft; e.g., a twin engine aircraft like that shown in FIG. 2. Hence, the present disclosure is not limited to a particular number of present disclosure HEP systems 20 powering an aircraft.

Figure 5:
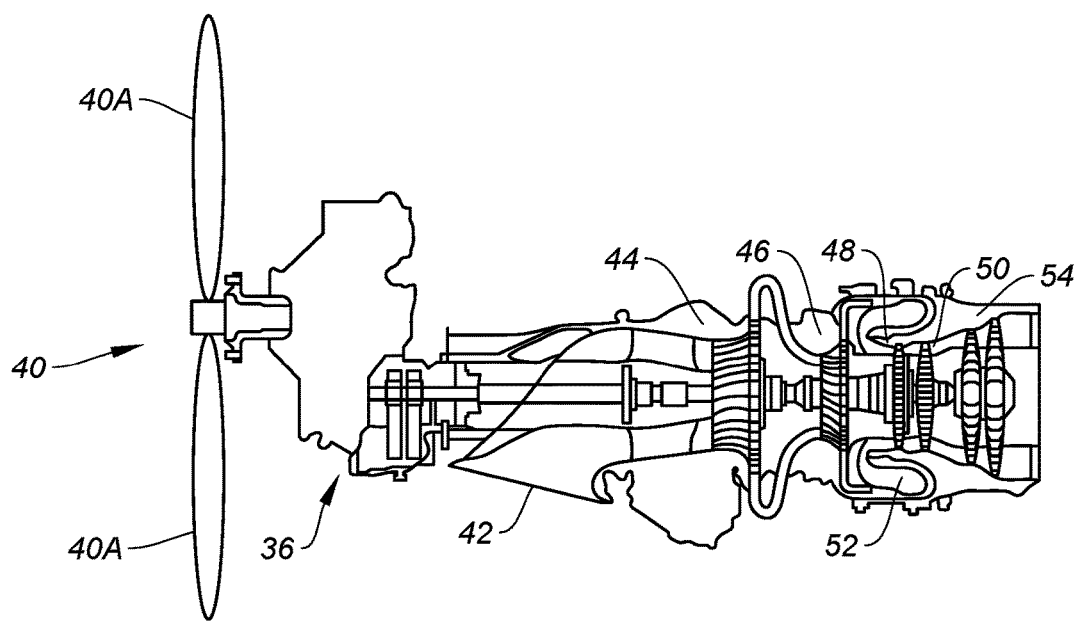
FIG. 5 is a diagrammatic sectional view of an exemplary gas turbine engine.

The term "thermal engine" as used herein includes various types of gas turbine engines, internal combustion engines, and the like that combust traditional aviation fuels and/or sustainable aviation fuels (SAFs), or the like. FIG. 5 is a diagrammatic cross-sectional view of gas turbine engine that includes a propeller 40, a reduction gearbox 36 (RGB), an inlet duct 42, a low pressure compressor 44, a high pressure compressor 46, a high pressure turbine 48, a low pressure turbine 50, and a combustor 52. In some instances, the thermal engine 22 may include one or more power turbines 54. The gas turbine engine shown in FIG. 5 is a nonlimiting example of a thermal engine 22. The present disclosure HEP system 20 may include other gas turbine engine configurations, or the thermal engine 22 may be a piston engine or a rotary engine.

Referring to FIGS. 3 and 4, the eMotor 24 may be an alternating current (AC) motor configured to rotationally drive a component. For example, the eMotor 24 may be configured to rotationally drive at least a portion of a gearbox 36 (e.g., see FIG. 3), or may be configured to provide rotational drive to a thermal engine 22 (e.g., see FIG. 4), or the like.

The propulsion unit 28 is a driven device that is configured to selectively produce thrust that can be used to power an aircraft. The propulsion unit 28 as described herein includes a propeller 40 that has propeller blades 40A and a mechanism for adjusting the pitch of the propeller blades 40A (sometimes referred to as a "pitch change mechanism 56"—see FIGS. 6 and 7). Hydro-mechanical pitch change mechanisms 56 are known in the art, and the present disclosure is not limited to any particular type of hydro-mechanical pitch change mechanism 56 for adjusting propeller pitch. The present disclosure is not limited to use with a propulsion unit 28 that includes propeller blades 40A.

The electric power storage unit 26 is configured to selectively store electrical energy in a first operational mode (i.e., a charging mode), and to produce electrical energy in a second operational mode (i.e., a discharging mode). An example of an electric power storage unit 26 is one that includes one or more batteries. Electric power storage devices other than batteries may be used in some embodiments.

The eMotor control system 30 may include hardware and controls for providing electrical power to the eMotor 24. In those embodiments wherein the electric power storage unit 26 provides the electrical power used to power the eMotor 24, the eMotor control system 30 may include an inverter configured to manage electrical power from the electric power storage unit 26. In some embodiments, the eMotor 24 is configured to operate the eMotor 24 in an electric motor mode wherein the eMotor 24 produces rotational shaft power. In some embodiments, the eMotor control system 30 may be configured to selectively operate the eMotor 24 in a generator mode wherein the eMotor 24 produces electrical power. In the generator mode, the eMotor control system 30 may be configured to manage the generator produced electrical power to the electric power storage unit 26 for recharging purposes.

The fuel system 32 may include a fuel reservoir and one or more fuel pumps for pumping the fuel to the thermal engine 22.

The fuel control system 34 may include an electronic controller such as a FADEC or may include a mechanical controller, or any combination thereof. The present disclosure is not limited to any particular type of fuel control system 34.

The gearbox 36 may assume different configurations. The term "gearbox" as used herein may refer to a reduction gearbox that is configured to accept an input rotational drive at a first rotational drive speed (S1) and at a first torque (T1) and produce an output rotational drive at a second rotational drive speed (S2) and at a second torque (T2), wherein the first rotational drive speed is greater than the second rotational drive speed (S1>S2) and the second torque is greater than the first torque (T2>T1). The present disclosure is not limited to any particular type of gearbox 36. In a first configuration, a gearbox 36 may be driven by the thermal engine 22, or by the eMotor 24, or a combination thereof; e.g., a parallel configuration as diagrammatically shown in FIG. 2. In a second configuration (e.g., a series configuration as diagrammatically shown in FIG. 3), an eMotor 24 may be in drive communication with a first gearbox (i.e., "eMotor gearbox 36A") and that first gearbox 36A may be in drive communication with a thermal engine 22. The thermal engine 22, in turn, may be in drive communication with a second gearbox (i.e., "output gearbox 36B") and that second gearbox 36B may be in drive communication with a propulsion unit 28. The present disclosure is not limited to the configurations diagrammatically shown in FIGS. 3 and 4. In some embodiments, the HEP system 20 may be configured to permit selective decoupling between the thermal engine 22 and the gearbox 36, 36B.

The term "controller" as used herein refers to a device that may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the HEP system 20 (or a system component) to accomplish the same algorithmically and/or coordination of system components. A controller may include or may be in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. A controller may include, or may be in communication with, an input device that enables a user to enter data and/or instructions, and may include, or be in communication with, an output device configured, for example to display information (e.g., a visual display or a printer), or to transfer data, etc. Communications between a controller and other system components may be via a hardwire connection or via a wireless connection.

Some present disclosure HEP system 20 embodiments have integrated system components. A system controller 58 may be utilized to control those system components and to perform the functionality described herein. In some embodiments the eMotor control system 30 may be integral with a system controller 58. In other system embodiments, one or more system components may include a dedicated controller for the respective component and that component controller is in communication with a system controller 58. For example, in some embodiments the eMotor control system 30 may include a controller and may be independent of and in communication with a system controller 58. In other system embodiments, component controllers may be in communication with one another and collectively configured as a system controller. FIGS. 3 and 4 diagrammatically illustrate the HEP system 20 having an independent system controller 58 to facilitate the description herein. The present disclosure HEP system 20 is not limited to having an independent system controller 58, and in fact is not limited to any particular controller architecture unless specifically stated herein.

Implementation of the techniques, blocks, steps, and means described herein may be done in various ways. For example, these techniques, blocks, steps, and means may be implemented in hardware, software, or a combination thereof. For a hardware implementation, processing devices configured to carry out the described functions and steps (e.g., by executing stored instructions) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein, and/or any combination thereof.

Embodiments of the present disclosure may be described herein as a process which is depicted as a flowchart, a flow diagram, a block diagram, etc. Although any one of these structures may describe the operations as a sequential process, many of the operations can be performed in parallel and/or concurrently. In addition, the order of the operations may be rearranged. A process may correspond to a method, a function, a procedure, a subroutine, a subprogram, etc.

In the system embodiment shown in FIG. 3, the eMotor control system 30 is in communication with the eMotor 24 and with the electric power storage unit 26. The eMotor control system 30 may be configured to provide electrical power (e.g., originating from the electric power storage unit 26, or from a generator 38, or other electrical power source) to the eMotor 24 and configured to control operation of the eMotor 24 (e.g., via stored instructions). The fuel control system 34 is in communication with the thermal engine 22 and the fuel system 32 and may be configured (e.g., via stored instructions) to control the thermal engine 22 and the fuel system 32. In this embodiment, the eMotor 24 and the thermal engine 22 are both in drive communication with the gearbox 36 in a parallel configuration as mechanical power inputs into the gearbox 36. The propulsion unit 28 is in drive communication with an output of the gearbox 36 and is therefore driven by the gearbox 36 output when the HEP system 20 is operating in a normal mode.

In the embodiment shown in FIG. 4, the eMotor control system 30 is in communication with the eMotor 24, the electric power storage unit 26, and the generator 38 (if included). The eMotor control system 30 may be configured to provide electrical power from the electric power storage unit 26 (or from a generator 38) to the eMotor 24 in a form acceptable to the eMotor 24 and to control operation of the eMotor 24 (e.g., via stored instructions). The fuel control system 34 is in communication with the thermal engine 22 and the fuel system 32 and may be configured (e.g., via stored instructions) to control the thermal engine 22 and the fuel system 32. In this embodiment, the eMotor 24 is in drive communication an eM gearbox 36A, the eM gearbox 36A is in drive communication with the thermal engine 22, and the thermal engine 22 is in drive communication with the output gearbox 36B. The output gearbox 36B, in turn, is in drive communication with the propulsion unit 28. Hence, the eMotor 24, eM gearbox 36A, the thermal engine 22, the output gearbox 36B, and the propulsion unit 28 are disposed in a series configuration.

In those present disclosure HEP system 20 embodiments that include an optional electric generator (independent of the eMotor 24), the electrical power produced by the optional electric generator when the HEP system 20 is operating in a normal mode may be used for electrical demands within the aircraft and/or may be used to provide electrical power to the eMotor 24 under operating scenarios wherein the eMotor 24 is operating as an electric motor providing propulsive power in combination with the thermal engine 22.

Figure 1:
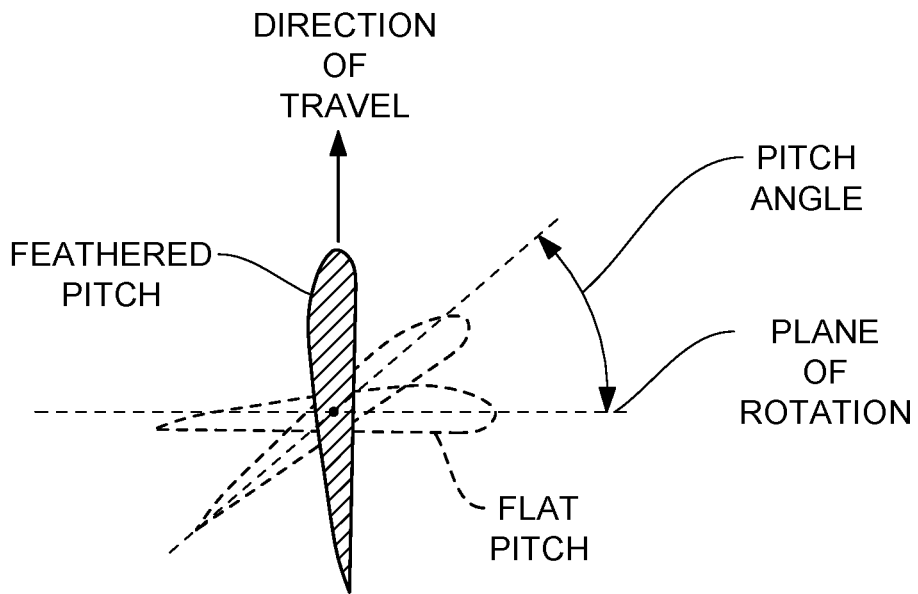
FIG. 1 is a diagram of propeller pitch relative to direction of travel and propeller plane of rotation.
Figure 6:
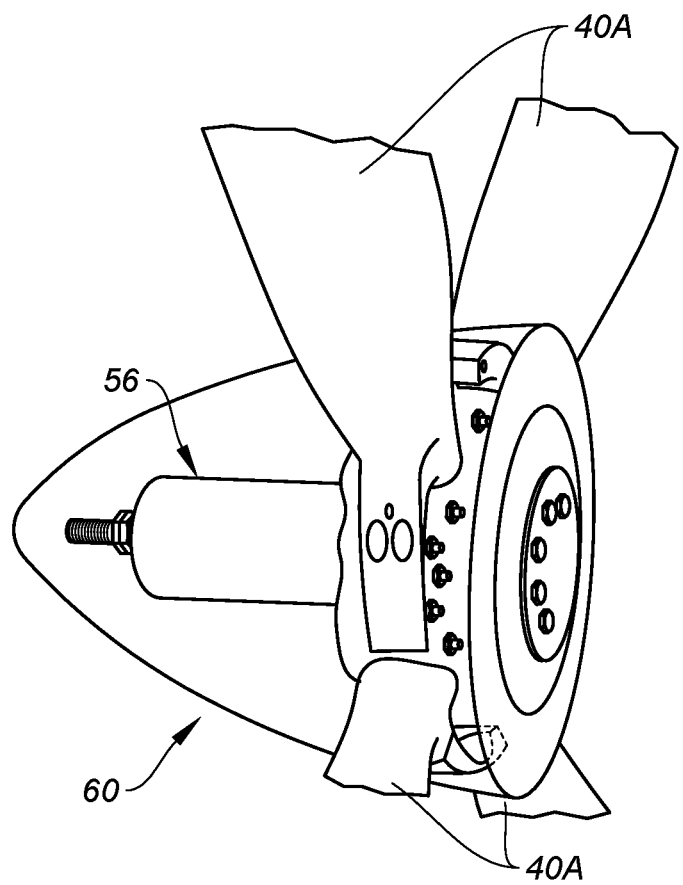
FIG. 6 is a diagrammatic representation of a propulsion unit with a pitch change mechanism.
Figure 7:
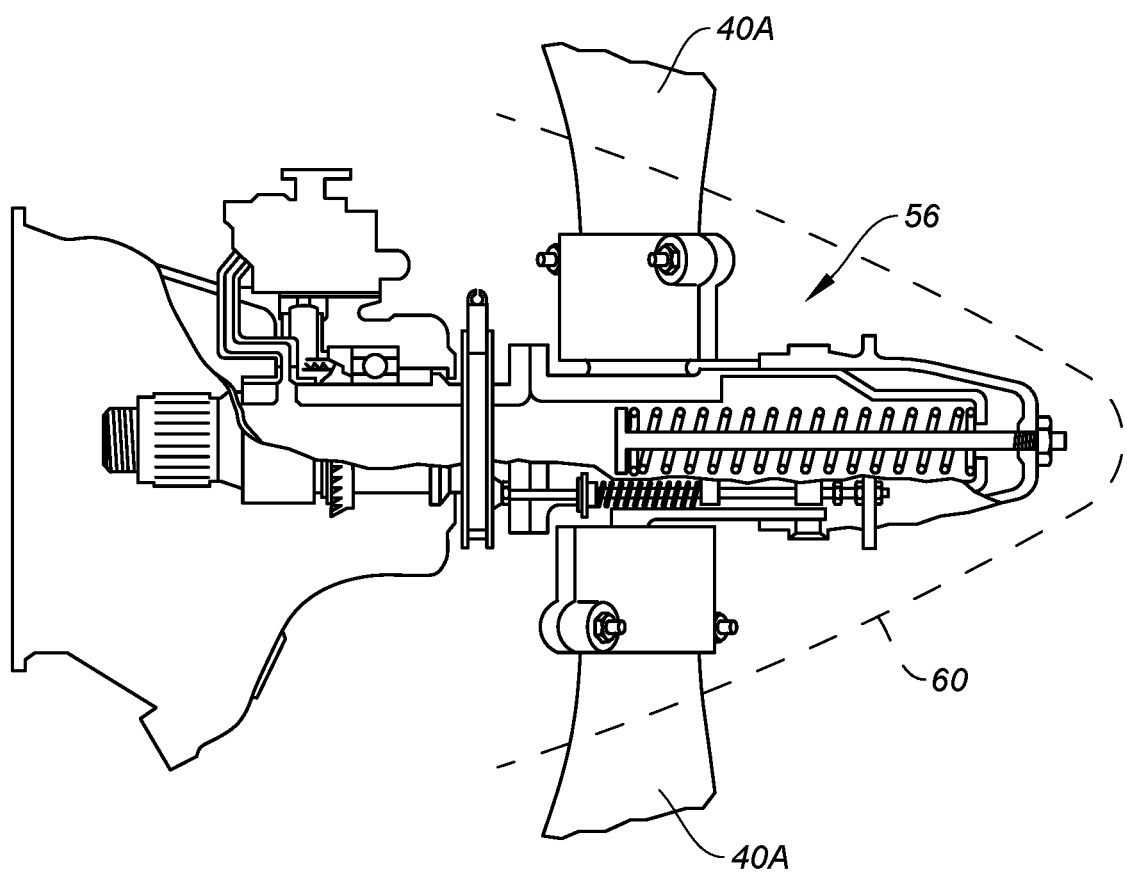
FIG. 7 is a diagrammatic representation of a propulsion unit with a hydro-mechanical pitch change mechanism.

Many aircraft propulsion systems utilize a hydro-mechanical pitch change mechanism 56 to selectively vary the pitch of the propeller blades 40A. FIGS. 6 and 7 diagrammatically illustrate a nonlimiting example of a pitch change mechanism 56 enclosed by the spinner 60 of a propulsion unit 28. The pitch of a propeller blade 40A can be varied by rotating the propeller blade 40A about the longitudinal axis of the propeller blade 40A. Varying the pitch of the propeller blades 40A (i.e., the angle of the blades 40A relative to the propeller's plane of rotation—see FIG. 1) enables the operator to vary the amount of torque required to rotate the propeller 40. In this manner, the pitch change mechanism 56 can be used to achieve preferred operating parameters. In addition, as will be detailed herein the present disclosure greatly enhances the ability of the pitch change mechanism 56 to feather a propeller blade 40A in a thermal engine 22 inoperable condition/shutdown mode and thereby decrease drag on the aircraft that may be otherwise produced by the propeller 40 (and/or avoid undesirable air flow effects).

Figure 8:
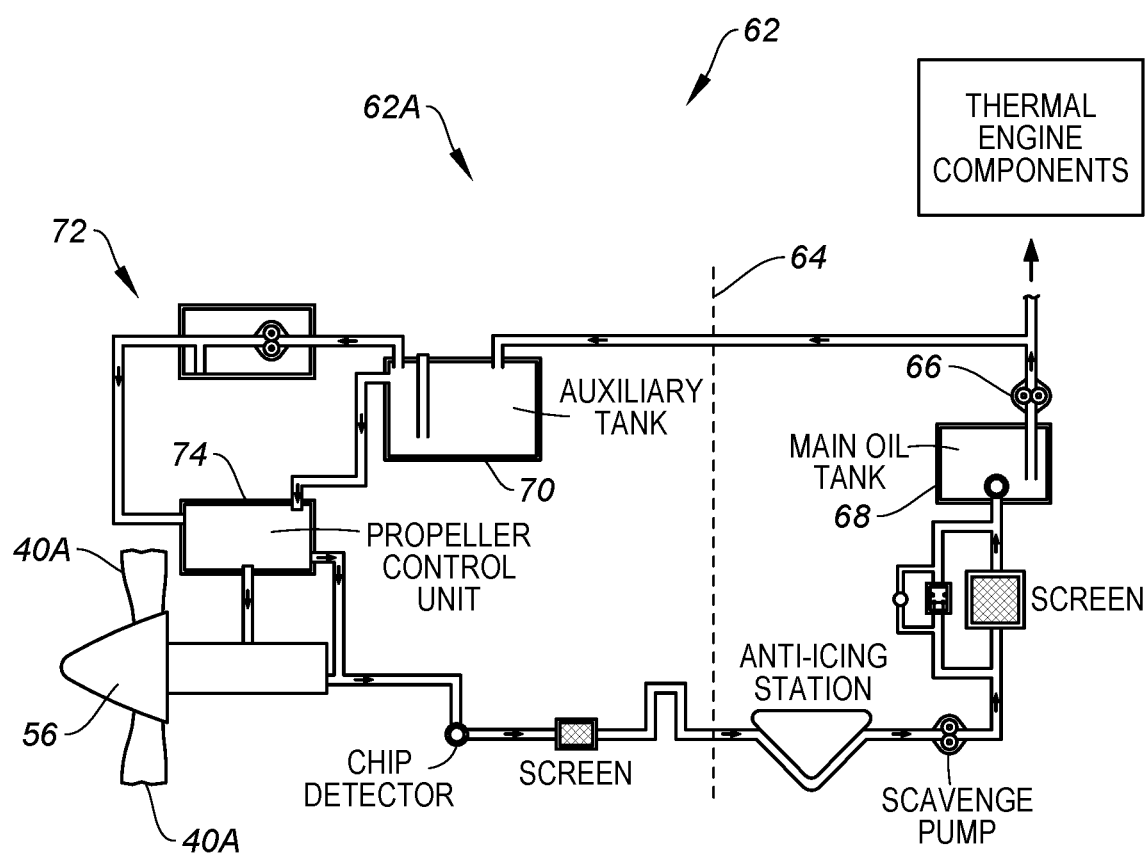
FIG. 8 is a diagrammatic representation of an engine oil system for a thermal engine oil system.
Figure 9:
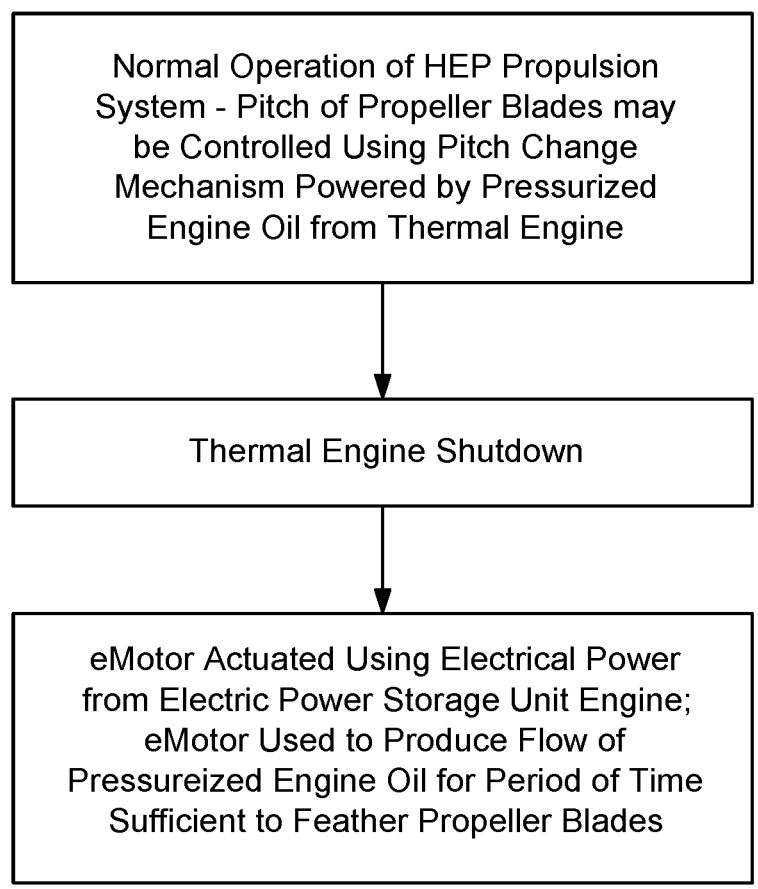
FIG. 9 is a flow chart of an embodiment of a present disclosure system operation.

FIG. 8 diagrammatically partially illustrates an engine oil system 62. The engine oil system portion 62A on the left side of the dashed line 64 diagrammatically illustrates the engine oil system portion involved with the pitch change mechanism 56. The present disclosure is not limited to this engine oil system example. The engine oil system 62 includes an oil system main pump 66 (e.g., a positive displacement pump such as a gear pump) in mechanical engagement with the thermal engine 22 (e.g., via a gearbox 36—see FIG. 3, or other gearbox) configured for circulating a pressurized flow of engine oil through the engine oil system 62, including the pitch change mechanism 56 of the propulsion unit 28. The main pump 66 is diagrammatically shown drawing engine oil from the main oil tank 68. FIG. 8 diagrammatically illustrates a first portion of the flow of engine oil exiting the main pump 66 passing to the structure associated with the pitch change mechanism 56 (e.g., an auxiliary tank 70, a propeller blade angle control circuit 72, a propeller control unit 74, and the like), and a second portion of the flow of engine oil exiting the main pump passing to the thermal engine components; e.g., engine bearings, gearboxes, and the like.

The propeller blade angle control circuit 72 is a system of fluid lines, connectors, valves, and other components that supply engine oil to the mechanisms that change the pitch of the propeller blades 40A. In the example embodiment diagrammatically shown in FIG. 8, the propeller control unit 74 is configured to control the pitch change mechanism 56. More specifically, the propeller control unit 74 modulates the supply of engine oil that is used to modify the pitch angle of the propeller blades 40A via the pitch change mechanism 56. The propeller control unit 74 may have any suitable arrangement of components (e.g., actuators, valves, and the like) to achieve this functionality.

FIG. 8 diagrammatically shows an engine oil return system that receives engine oil scavenged from the pitch change mechanism 56 (or from bypass passages around the pitch change mechanism 56) that include chip detectors to detect the presence of debris in the engine oil, screens to capture debris, and an anti-icing station. A scavenge pump pressurizes the engine oil and sends it back to the main oil tank 68 of the engine oil system 62. As indicated above, engine oil may be pumped from the main oil tank 68 to the auxiliary tank 70 and the oil passage cycle repeated.

Referring to FIGS. 3, 4, 8, and 9, during operation of a propulsion unit 28, it is possible that a thermal engine 22 may experience a malfunction that requires, or results in, a shutdown of the thermal engine 22; i.e., the thermal engine 22 functioning in a shutdown mode. The term "shutdown mode" as used herein refers to a thermal engine 22 mode of operation wherein the thermal engine 22 is operating in manner such that a main oil pump 66 driven solely by the thermal engine 22 (which main oil pump 66 is normally configured to produce a flow of engine oil at a pressure and volumetric rate sufficient to operate the pitch change mechanism 56) cannot produce the flow of engine oil sufficient to operate the pitch change mechanism 56. An example of the thermal engine 22 operating in a shutdown mode is when fuel flow to the thermal engine 22 is terminated, thereby stopping any combustion within the thermal engine 22 that enables the thermal engine 22 to produce power. Another example of the thermal engine 22 operating in a shutdown mode is when the thermal engine is experiencing a malfunction (mechanical, electrical, or the like) that impairs thermal engine 22 to an extent such that a flow of engine oil at a pressure and volumetric rate sufficient to operate the pitch change mechanism 56 cannot be produced. The above described "shutdown mode" scenarios are provided as examples, and do not represent all possible shutdown mode causes. In a shutdown mode, the rotational speed of the thermal engine 22 reduces (e.g., the thermal engine 22 "spools down"). In an engine system that includes a main oil pump 66 driven solely by the thermal engine 22, the main oil pump 66 will consequently also spool down and the flow of engine oil (and the pressure of that flow) to both the thermal engine components and the pitch change mechanism 56 will decrease. If the thermal engine 22/main oil pump 66 spools down rapidly (as may occur because the non-operating thermal engine 22 will likely have a rotational resistance), the flow of engine oil to the pitch change mechanism 56 may not provide the motive force for a period of time sufficient to permit the propeller blades 40A to fully feather; i.e., rotate the blades 40A to a very high pitch—see FIG. 1. If that occurs, the propeller blades 40A may produce significant drag that can undesirably affect the operation of the aircraft.

Embodiments of the present disclosure HEP system 20 advantageously enable the pitch change mechanism 56 to feather the propeller blades 40A even if the thermal engine 22 is in a shutdown mode. More specifically, the present disclosure HEP system 20 is configured to use the eMotor 24 to produce a flow of pressurized engine oil for a period of time sufficient to permit the pitch change mechanism 56 to feather the propeller blades 40A.

Referring to the present disclosure parallel configuration HEP system 20 shown in FIG. 3, the eMotor 24 may be operated in a variety of different ways during normal HEP system 20 operation. For example, the eMotor 24 may be used to provide drive input into the gearbox 36 during startup or shutdown when the thermal engine 22 is not operating, or in combination with the thermal engine 22 during certain aspects of the flight plan (e.g., during a climbing portion, or during a cruise portion, etc.), or the like. During those aspects of the flight plan when both the thermal engine 22 and the eMotor 24 are operating, the energy required to power the eMotor 24 may be produced by the generator 38 (if included) or by the electric power storage unit 26. During those aspects of the flight plan when only the eMotor 24 is operating, the energy required to power the eMotor 24 may be produced by the electric power storage unit 26.

In the event of a thermal engine 22 passing into a shutdown mode, the eMotor 24 may be used to drive the gearbox 36 and in turn drive the thermal engine 22 while the thermal engine 22 is in a shutdown mode; e.g., the thermal engine components are rotated via the drive input from the gearbox 36/eMotor 24. The rotation of the thermal engine components, in turn, causes actuation of the main oil pump oil 66 that is in mechanical engagement with the thermal engine 22. In this HEP system 20 operating mode, the main oil pump 66 is operated to produce a pressurized flow of engine oil sufficient to permit the pitch change mechanism 56 to feather the propeller blades 40A. In this manner, the present disclosure permits the propeller blades 40A to be feathered in a thermal engine 22 shutdown scenario. Hence, the present disclosure avoids a scenario wherein propeller blades 40A cannot be completely feathered if the thermal engine 22 spools down in a period of time less than the amount of time it normally takes to feather the propeller blades 40A. The present disclosure may avoid the use of an alternative auxiliary feather pump.

Referring to the present disclosure parallel configuration HEP system 20 shown in FIG. 4, here again the eMotor 24 may be used in a variety of different ways during normal HEP system 20 operation and the present disclosure HEP system 20 is not limited to using the eMotor 24 in any particular way during normal HEP system 20 operation.

In the event of a thermal engine 22 passing into shutdown mode, the eMotor 24 may be powered solely using electrical power produced by the electric power storage unit 26. The eMotor 24 may be controlled to drive the eMotor gearbox 36A and in turn drive the thermal engine 22 while the thermal engine 22 is in a shutdown mode; e.g., the thermal engine components are rotated via the drive input from the gearbox 36A/eMotor 24. The rotation of the thermal engine components, in turn, causes actuation of the main oil pump oil 66 that is in mechanical engagement with the thermal engine 22. In this HEP system 20 operating mode, the main oil pump 66 is operated to produce a pressurized flow of engine oil sufficient to permit the pitch change mechanism 56 to feather the propeller blades 40A. In this manner, the present disclosure permits the propeller blades 40A to be feathered in a thermal engine 22 shutdown scenario. Hence, the present disclosure avoids a scenario wherein propeller blades 40A cannot be completely feathered if the thermal engine 22 spools down in a period of time less than the amount of time it normally takes to feather the propeller blades 40A.

As stated herein, the eMotor control system 30 may be configured to control operation of the eMotor 24 (e.g., via stored instructions). In some embodiments, the eMotor control system 30 may control the eMotor 24 (e.g., control the rate of change of the eMotor 24 speed) so that the rate of unfeathering of the propeller 40 is controlled as a function of torque and/or rate of change of torque applied by the eMotor 24 to the propeller 40.

In some embodiments, the present disclosure HEP system 20 may be integrated with an autofeathering system wherein the eMotor 24 is operated to produce pressurized engine oil (e.g., by driving the hydraulic fluid pump) that can be used to actuate the pitch change mechanism 56 to feather the propeller blades propulsion unit 28 start-up or during aspects of the take-off phase. Autofeathering systems may be limited to operating under some but not all operational conditions; e.g., limited to use when the propulsion system is in a takeoff power setting. The present disclosure HEP system 20 may be used on all thermal engine shutdown scenarios. In some embodiments, the present disclosure HEP system 20 may be integrated with an autofeathering system to keep the propeller 40 windmilling at a minimum speed until successful feathering of the propeller 40 is achieved.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A hybrid electric propulsion (HEP) system for an aircraft, comprising:
   a thermal engine having an engine oil system with a main oil pump configured to be driven by the thermal engine;
   an electric motor;
   a gearbox in communication with the thermal engine and the electric motor;
   an electric power storage unit;
   a propulsion unit including a propeller having propeller blades, and a hydro-mechanical pitch change mechanism; and
   a controller in communication with the thermal engine, the electric motor, the propulsion unit, and a memory storing instructions, which instructions when executed cause the controller to control the electric motor to operate using electrical power from the electric power storage unit to cause the main oil pump to actuate and produce a pressurized flow of engine oil to the pitch change mechanism for a period of time sufficient for the pitch change mechanism to feather the propeller blades.

2. The hybrid electric propulsion system of claim 1, wherein the thermal engine and the electric motor are in communication with the gearbox in a parallel configuration.

3. The hybrid electric propulsion system of claim 1, wherein the gearbox is in communication with thermal engine and the propulsion unit.

4. The hybrid electric propulsion system of claim 3, wherein the instructions when executed cause the controller to control the electric motor to operate using electrical power from the electric power storage unit to cause the main oil pump to actuate and produce the pressurized flow of engine oil to the pitch change mechanism for the period of time sufficient for the pitch change mechanism to feather the propeller blades when the thermal engine is in a shutdown mode.

5. The hybrid electric propulsion system of claim 1, wherein the instructions when executed further cause the controller to control the electric motor to selectively operate in a generator mode when the hybrid electric propulsion system is operating in a normal mode.

6. The hybrid electric propulsion system of claim 1, further comprising an electric motor control system integral with the controller, wherein the electric motor control system includes an inverter.

7. The hybrid electric propulsion system of claim 1, further comprising an electric motor control system independent of and in communication with the controller, wherein the electric motor control system includes an inverter.

8. The hybrid electric propulsion system of claim 1, further comprising a second gearbox in communication with the thermal engine and the electric motor, wherein the electric motor, the gearbox, the thermal engine, the second gearbox and the propulsion unit are disposed in a series arrangement.

9. The hybrid electric propulsion system of claim 8, wherein the instructions when executed cause the controller to control the electric motor to operate using electrical power from the electric power storage unit to cause the main oil pump to actuate and produce the pressurized flow of engine oil to the pitch change mechanism for the period of time sufficient for the pitch change mechanism to feather the propeller blades when the thermal engine is in a shutdown mode.

10. The hybrid electric propulsion system of claim 8, wherein the instructions when executed further cause the controller to control the electric motor to selectively operate in a generator mode when the hybrid electric propulsion system is operating in a normal mode.

11. The hybrid electric propulsion system of claim 8, further comprising an electric motor control system integral with the controller, wherein the electric motor control system includes an inverter.

12. The hybrid electric propulsion system of claim 8, further comprising an electric motor control system independent of and in communication with the controller, wherein the electric motor control system includes an inverter.

13. The hybrid electric propulsion system of claim 1, wherein the instructions when executed cause the controller to control the electric motor to control a rate of unfeathering of the propeller.

14. The hybrid electric propulsion system of claim 13, wherein the instructions when executed cause the controller to control the electric motor as a function of a torque and/or a rate of change of torque applied by the electric motor to the propeller.

* * * * *